Reissued July 3, 1951

Re. 23,387

UNITED STATES PATENT OFFICE 23,387

ABRASIVE ARTICLES AND METHODS OF MANUFACTURING THE SAME

Norman P. Robie, Lewiston, and Osborne L. Mahlman, Kenmore, N. Y., assignors to The Carborundum Company, Niagara Falls, N. Y., a corporation of Delaware No Drawing. Original No. 2,369,689, dated February 20, 1945, Serial No. 418,010, November 6, 1941. Application for reissue July 1, 1947, Serial No. 758,282

13 Claims. (Cl. 51—298)

Matter enclosed in heavy brackets [ ] appears in the original patent but forms no part of this reissue specification; matter printed in italics indicates the additions made by reissue.

This invention relates to abrasive articles and methods of manufacturing the same. More specifically, the invention is concerned with the production of abrasive products in which the bond comprises the resinous reaction product of an unsaturated monomeric material with the unsaturated esterification product of an alcohol and a polybasic acid.

Although the invention is adapted to the production of various types of abrasives, including both the coated abrasives as represented by the conventional "sandpaper" and the bonded articles such as abrasive wheels or stones, it is particularly well adapted for production of very dense bonded articles which are substantially free from pore space. Such articles are of particular utility in the field of fine finishing and in cases where it is desired that the abrasive article shall maintain its grinding face while grinding as, for example, in the field of thread grinding.

A very large part of the resin bonded abrasive articles is made with a phenol aldehyde condensation product as the bond. Such products have a wide utility, but the phenol aldehyde resins are not well suited for the production of extremely dense wheels because during the curing or heat-hardening of the resin gaseous products are evolved, and unless the abrasive article has a certain minimum porosity to allow for the escape of these gases the article swells and bloats and is therefore unsatisfactory.

Attempts have been made to make very dense articles by the polymerization of monomeric materials such as vinyl esters or the esters of acrylic acid. Such polymerization does not involve the evolution of gaseous by-products and is therefore adapted to the production of dense, nonporous bodies. However, this process is unsatisfactory for two principal reasons. In the first place, the monomeric materials are thin liquids and it is difficult to get a stable and homogeneous suspension of the abrasive particles in such liquids. In the second place, the polymerization products are permanently thermoplastic as distinguished from the heat-hardened infusible type obtained by the reaction of phenol with aldehydes, and when such articles are used for dry grinding the bond softens and both smears the work with the bond and picks up the detritus formed by grinding to cause the articles to become loaded.

It is accordingly an object of the present invention to provide abrasive articles in which the bond is infusible and which have substantially no porosity. Another object of the invention is the provision of abrasive articles and method of manufacturing such articles which are dense, hard and substantially free from porosity. Another object of the invention is the provision of a bond for abrasive articles which will have sufficient viscosity to be satisfactory in the production of both molded and coated articles and which will heat-harden to a substantially infusible condition without the generation of gaseous by-products. A further object of the invention will be apparent from the consideration of the following specification.

We have discovered that the objects set forth above can be accomplished by employing, as a binder for the abrasive grains, the reaction product of a mixture of unsaturated monomeric materials with unsaturated esterification products of alcohols with polybasic organic acids. The unsaturation of the esters, which are commonly employed in the form of polyesters, can be provided by the use of either an unsaturated alcohol or an unsaturated polybasic acid or both. The polybasic acids are characterized by the presence of two or more carboxyl groups (COOH), the hydrogen of which combines with the hydroxyl group (OH), which is characteristic of alcohols, to form water and join the remaining part of alcohol and acid groups into an ester. When a polybasic acid containing two carboxyl groups, reacts with an alcohol containing two hydroxyl groups, the reaction product is of the nature of a chain in which one carboxyl of the acid joins to one hydroxyl of an alcohol molecule the other carboxyl group of the acid being reacted with a different alcohol molecule. Such products are herein referred to as "polyesters" because they comprise molecules made up from a plurality of individual alcohol and acid molecules joined together as distinguished from the ordinary esters, which constitute individual and single ester molecules.

The polyesters formed in the primary stages of our invention are ordinarily very viscous liquids. Since the water formed by esterification is produced during this primary stage reaction we provide a part of the bond in the partially reacted condition such that no gaseous or volatile by-products are produced by further esterification. Consequently when the final or heat-hardening process is carried out the reaction is not accompanied by the evolution of volatile materials because the final step is a mere combination at the double bond, such as takes place in the ordinary linear polymerization of such materials as vinyl acetate or the acrylic acid compounds, the product of which is herein referred to as an "additive reaction product."

The infusibility of the products formed in accordance with our invention is brought about by reason of the fact that when the unsaturated polyesters of polybasic acids are mixed with polymerizable monomeric materials the chains formed during the polymerization are joined by the other component of the reaction mixture and the two or three dimensional molecule thus formed is more heat-resistant, whereas the straight chain molecules of such materials as polyvinyl acetate are softenable by heat. The process which we have described for the formation of polyesters requires the use of both polyhydric alcohols and polybasic acids. As an alternative we may employ unsaturated monohydric alcohols with unsaturated polybasic acids to form esters which polymerize by the conventional addition reaction brought about by the joining of the monomeric esters at some of the double bonds of the esters. These partially polymerized esters still contain sufficient unsaturation to be capable of interaction with the polymerizable monomeric materials to form the infusible binders characteristic of our invention.

We have found that polyesters formed by the reaction of diethylene glycol, which is a dihydric alcohol, with maleic or fumaric acids are well adapted for use in the forming of our binders where the polyesters are formed from polyhydric alcohols. For the production of esters with a monohydric unsaturated alcohol we have used allyl alcohol to form diallyl maleate or fumarate. For the polymerizable monomeric materials we have used vinyl compounds such as vinyl acetate and styrene and found them to be well suited to our purposes. Instead of these particular materials we can employ other polyhydric alcohols such as ethylene glycol; trimethylene glycol; tri and tetraethylene glycol; glycerol; propylene glycol, monoethylin, and unsaturated glycols such as obtained by hydrolysis of butadiene dibromide, and other polybasic unsaturated acids such as aconitic, citraconic, itaconic, vinylmalonic, the terpene-maleic anhydride adduct known as "Petrex" and the like. Other unsaturated monohydric alcohols which we may use include propargyl alcohol, methallyl alcohol, methyl vinyl carbinol, divinyl carbinol, 3-chloro-2-butanol-1, butadiene-1, 2-ol-4, crotyl alcohol and the like.

Instead of the vinyl compounds vinyl acetate and styrene specifically referred to above, we may employ, as the unsaturated monomeric compound various monomers, having solvent action on the esters and polyesters, such as vinyl chloracetate and other vinylesters, vinyl ketones, vinyl ethers, esters of acrylic and methacrylic acid, acrolein, acrylonitrile and the like. With these monomers which are soluble may be blended unsaturated monomers which are without a solvent action or are normally gaseous such as butadiene, vinyl chloride, coumarone, indene, isobutylene, chloroprene, vinyl acetylene and the like. When gaseous monomers are used the hardening may be performed under pressure.

Since we have found it is only necessary to provide occasional double bonds in the polyesters, we have successfully carried out our invention by using a mixture of an unsaturated polybasic acid with a saturated polybasic acid such as succinic acid, to form the polyesters. In such cases the degree of unsaturation depends upon the relative proportion of the unsaturated acid to the saturated acid, and by the selection of different kinds of acids and different proportions of unsaturated and saturated acids we are able to produce binders having quite different physical characteristics.

The polyesters we use may be further modified by using a monobasic acid with a polybasic acid. The monobasic acid limits the chain length of the polyester. With polyesters of short chain length we may obtain the necessary amount of unsaturation by using an unsaturated monobasic acid to limit the chain length. For instance, a short chain polyester with three unsaturations may consist of one mole of fumaric acid, two moles of glycol and two moles of methacrylic acid. The fumaric acid will be in the center with a mole of glycol on each side and the methacrylic acid on each end.

The invention will now be further described with reference to specific examples. It is to be understood that these examples merely illustrate certain embodiments of the invention which is capable of numerous variations and is to be limited only by the appended claims.

Example I.—We have found the new type of bond to be suitable for uniform, very hard, dense fine grid wheels used for razor honing. The following example illustrates this type of wheel.

The polyester of diethylene glycol fumarate was prepared by heating 1044 gms. fumaric acid with 990 gms. of diethylene glycol for seven hours on an oil bath reaching 200° C. in 2¼ hours and maintaining that temperature for the remaining time. Carbon dioxide was bubbled through the flask to agitate the mixture and prevent oxidation. A resinous balsam resulted Vinyl acetate and styrene monomers were separately distilled to remove the inhibitor and the reaction mixture for forming the bond was then made in the following proportions:

| | Grams |
|---|---|
| Diethylene glycol fumarate polyester | 514 |
| Inhibitor free vinyl acetate monomer | 163 |
| Inhibitor free styrene monomer | 88 |
| Benzoyl peroxide | 1.9 |

The polyester was warmed slightly and dissolved in the vinyl acetate, the benzoyl peroxide was dissolved in styrene, and the two solutions were mixed. The above bond mixture hardens at 130° F. to a very hard light amber colored glass-like resin which, when heated will char without fusion.

The liquid resin mixture was uniformly mixed with 750 gms. of very fine calcined alumina from the Bayer process and forced thru a fine screen to insure uniformity. The creamy syrup was then poured into cylindrical molds to give castings 5'' long x 3'' in diameter. The cast mixture prior to hardening was subjected to a mechanical vibration to cause all air bubbles to rise to the top where they can be removed. The casting was hardened at 130° F. for 48 hours. When cured it had shrunk away from the mold facilitating easy removal of final surfacing and insertion of the arbor. The product was a highly satisfactory razor blade honing wheel.

Example II.—Hard dense wheels suitable for thread grinding were produced from the following composition using the procedure of Example I.

| | Grams |
|---|---|
| 180 grit fused alumina | 440 |
| 400 grit fused alumina | 100 |
| Diethylene glycol fumarate polyester | 140 |
| Vinyl acetate monomer | 45 |
| Styrene monomer | 25 |
| Benzoyl peroxide | 0.5 |

The dense glass-like nature of this bond aids the grinding wheel to retain the shape of the grinding surface during the thread grinding operation.

Example III.—The polyesters may be diluted with sufficient vinyl resin monomer to give a sticky liquid adhesive very suitable for adhering abrasive grain to a backing.

100 gms. diethylene glycol-fumarate polyester made in accordance with Example I was mixed with 18 cc. diallyl fumarate and 32 cc. vinyl acetate monomer containing 0.2 gm. benzoyl peroxide. A sticky viscous liquid resulted. This was coated onto heavy 130# manila paper and 30 grit fused alumina was spread uniformly over the adhesive layer. Another light adhesive layer was spread over the grain. The coated paper was then cured at 150° F. for 46½ hours and then at 250° F. for 2½ hours. The resulting cured resin held the grain very tenaciously to the paper.

Example IV.—159 parts diethylene glycol was esterified with 174 parts aconitic acid while agitating with a $CO_2$ stream by heating to 150° C. in one hour, raising the temperature from 150 to 170° C. in ½ hour and holding the temperature at 170° C. for 2 hours. The aconitic acid polyester became a viscous balsam more quickly than the fumarate polyester. The aconitic acid ester also dissolves vinyl acetate more slowly than the fumarate polyester.

A resinous solution was prepared by adding 0.2 part benzoyl peroxide dissolved in 25 parts vinyl acetate, to 75 parts of the aconitic acid polyester. This resinous solution has sufficient acidity due to unesterified carboxyl groups in the polyester to be easily emulsified by an aqueous solution of sodium hydroxide. This emulsion was coated onto strong manila paper and the coated paper was covered with fused alumina abrasive. The emulsion was hardened by heating for 40 hours at 125° F. and 48 hours at 200° F. A flexible strong adhesive resulted holding the abrasive tenaciously to the backing.

Example V.—A hardened molded abrasive article bonded by a phenolic resin was made much more water resistant by filling the pores with the following composition:

| | Parts |
|---|---|
| Diethylene glycol fumarate polyester as per Example I | 175.5 |
| Vinyl acetate monomer | 58.5 |
| Styrene monomer | 58.5 |
| Benzoyl peroxide | 0.5 |

The article filled and submerged in the composition was warmed slightly above room temperature until the liquid formed a soft gel. The excess soft gel was then sliced off the abrasive article and the filled article further baked at 130° F. until the gel hardened to a hard glass-like resin filling the pores of the abrasive article. Such a filled abrasive article is adapted for use in warm water like a pulp wheel because of its resistance to water.

Example VI.—The solubility of our polyester toward vinyl monomers may be modified by the addition of a terpene-maleic anhydride adduct known as "Petrex." This modification also reduces the tendency of the resin to crack when curing quickly. A "Petrex" modified polyester was produced as follows:

| | Parts |
|---|---|
| Diethylene glycol | 80 |
| Fumaric acid | 43.5 |
| Petrex acid | 80 |

This mixture was heated, while bubbling nitrogen into the mix, taking 2½ hours to reach 195° C. and maintaining this temperature for two hours. A light amber, sticky, viscous balsam-like resin resulted.

An abrasive wheel employing this material was made of the following compositions:

70 parts of this Petrex modified polyester was mixed with:
70 parts styrene monomer
0.4 parts benzoyl peroxide
150 parts finely pulverized calcined alumina from the Bayer process.

This mix was run through a fine screen and cast into a razor honing wheel. The wheel was then hardened at 120° F. to produce a uniform solid wheel with surfaces free from pores, and suitable for honing razor blades.

We have described unsaturated polyesters suitable for our invention whose unsaturation is due to the unsaturated acid used. We may also produce our polyesters with an unsaturated alcohol such as allyl alcohol or with an unsaturated glycol such as butenediol and a saturated or an unsaturated acid.

The high strength of our binder may be illustrated by the following data obtained by casting 6" x 1" square test bars of filled and unfilled resin and determining its modulus of rupture.

| Resin composition | | No. 1 | No. 2 |
|---|---|---|---|
| Diethylene fumarate polyester | parts | 109 | 109 |
| Vinyl acetate monomer | do | 35 | 35 |
| Styrene monomer | do | 19 | 19 |
| Benzoyl peroxide | do | 0.4 | 0.5 |
| 200 mesh and finer fused quartz | do | | 150 |
| Modulus of rupture | | 13,160 | 6,320 |

The compositions were hardened 64 hours at 125° F. and then 7 hours at 200° F. The unfilled test bar was hard and glassy bending slightly in the testing machine before shattering into many pieces. The quartz filled bar resembled a piece of marble with a hard metallic ring.

It is obvious that the binders and adhesives described may be modified by the usual methods. Polymerization may be carried out under different conditions to modify the resin properties. Natural and synthetic resins and drying oils, may be blended with either the esters, polyesters or monomeric hardening agent. For example saturated soluble, uncured alkyd resins may be blended with our unsaturated polyesters. Polymers may be dissolved in the monomeric material before blending with the polyester and hardening. Catalysts, organic and inorganic fillers, dyestuffs, plasticizers and anticatalysts may also be employed.

We have described our invention with selected characteristic examples by way of illustration. It is obvious that modifications of the foregoing examples are possible. These modifications are apparent from the foregoing description and the invention is to be limited only by the accompanying claims.

We claim:

1. An abrasive article comprising abrasive grains and a hardened binder comprising the additive reaction product of a substantially neutral unsaturated monomeric material and an unsaturated esterification product of an aliphatic alcohol and a polybasic acid.

2. An abrasive article comprising abrasive grains and a hardened binder comprising the additive reaction product of a substantially neutral unsaturated monomeric material with a polyester of an aliphatic polyhydric alcohol and an unsaturated polybasic acid.

3. An abrasive article comprising abrasive grains and a hardened binder comprising the additive reaction product of a substantially neutral unsaturated monomeric material with a polyester of an unsaturated aliphatic alcohol and a polybasic acid.

4. An abrasive article comprising abrasive grains and a binder comprising the additive reaction product of a vinyl compound and an unsaturated esterification product of an aliphatic alcohol and a polybasic acid.

5. An abrasive article comprising abrasive grains and a hardened binder comprising the additive reaction product of diethylene glycol fumarate polyester and a vinyl compound.

6. An abrasive article comprising abrasive grains and a hardened binder comprising the additive reaction product of a substantially neutral unsaturated monomeric material and an ester of an unsaturated aliphatic monohydric alcohol and an unsaturated polybasic acid.

7. An abrasive article comprising abrasive grains and a hardened binder comprising the additive reaction product of diallyl fumarate and a vinyl compound.

8. An abrasive article comprising bonded abrasive grains molded and hardened to shape and impregnated with an additional hardened binder comprising the additive reaction product of a substantially neutral unsaturated monomeric material with an unsaturated esterification product of an aliphatic alcohol and a polybasic acid.

9. An abrasive article comprising abrasive grains and a hardened binder comprising the additive reaction product of a substantially neutral unsaturated monomeric material with an unsaturated esterification product of an aliphatic polyhydric alcohol and both a monobasic and a polybasic acid.

10. The method of making abrasive products which comprises preparing an unsaturated polyester by reacting an aliphatic alcohol with a polybasic acid, mixing the ester with a substantially neutral unsaturated monomeric material reactive therewith and with abrasive grains, and heating the article to solidify the binder by bringing about an additive reaction between the monomeric material and the polyester to cross-link polyester molecules.

11. The method of making a dense abrasive article which is substantially free from porosity which comprises commingling an unsaturated polyester, a substantially neutral unsaturated monomeric material reactive with the said polyester and abrasive grains, shaping an article from the mixture thus prepared, and heating the article to solidify the binder to an infusible state by bringing about an additive reaction between the monomeric material and the polyester to cross-link polyester molecules.

12. The method of making a coated abrasive article which comprises preparing a liquid adhesive comprising an unsaturated esterification product of an aliphatic alcohol with a polybasic acid and a substantially neutral unsaturated monomeric material reactive with the said esterification product, coating a backing with such adhesive and abrasive grains, and heating the article to harden the binder by bringing about an additive reaction between the monomeric material and the esterification product to cross-link the esterification product molecules.

*13. An abrasive article comprising abrasive particles embedded in a binder which is a copolymerization product of a mixture comprising diallyl maleate and styrene.*

NORMAN P. ROBIE.
OSBORNE L. MAHLMAN.

REFERENCES CITED

The following references are of record in the file of this patent or the original patent:

UNITED STATES PATENTS

| Number | Name | Date |
|---|---|---|
| 1,901,325 | Novotny | Mar. 14, 1933 |
| 1,975,246 | Zwilgmeyer | Oct. 2, 1934 |
| 2,047,398 | Voss et al. | July 14, 1936 |
| 2,184,293 | Edgar | Dec. 26, 1939 |
| 2,195,215 | Kistler | Mar. 26, 1940 |
| 2,195,362 | Ellis | Mar. 26, 1940 |
| 2,202,765 | Guth | May 28, 1940 |
| 2,259,512 | Barnes | Oct. 21, 1941 |
| 2,403,213 | D'Alelio | July 2, 1946 |